(12) United States Patent
Bofinger et al.

(10) Patent No.: US 7,767,351 B2
(45) Date of Patent: Aug. 3, 2010

(54) FUEL CELL WITH CARTRIDGE AND COLORANT

(75) Inventors: Anna Maria Bofinger, Nashua, NH (US); Andrew G. Gilicinski, Westborough, MA (US); Javit A. Drake, Waltham, MA (US); Leslie J. Pinnell, Framingham, MA (US); Steven J. Specht, Brookfield, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/617,930

(22) Filed: Nov. 13, 2009

(65) Prior Publication Data

US 2010/0062310 A1    Mar. 11, 2010

Related U.S. Application Data

(62) Division of application No. 11/137,848, filed on May 25, 2005, now Pat. No. 7,638,214.

(51) Int. Cl.
*H01M 8/00* (2006.01)
*H01M 8/04* (2006.01)
*H01M 2/38* (2006.01)
*H01M 2/40* (2006.01)
*H01M 8/24* (2006.01)

(52) U.S. Cl. .................. 429/400; 429/443; 429/449; 429/462

(58) Field of Classification Search .......... 429/13, 429/34, 38, 90, 12
See application file for complete search history.

(56) References Cited

U.S. PATENT DOCUMENTS

| | | | |
|---|---|---|---|
| 5,192,984 A | 3/1993 | Beecher et al. | |
| 6,460,733 B2 | 10/2002 | Acker et al. | |
| 6,503,294 B2 | 1/2003 | Yoshikawa et al. | |
| 6,998,185 B2 | 2/2006 | Gore et al. | |
| 7,314,493 B2 | 1/2008 | Ren et al. | |
| 2001/0049045 A1 | 12/2001 | Hockaday et al. | |
| 2002/0127141 A1 | 9/2002 | Acker | |
| 2002/0182459 A1 | 12/2002 | Hockaday et al. | |
| 2002/0197522 A1 | 12/2002 | Lawrence et al. | |
| 2003/0129464 A1 | 7/2003 | Becerra et al. | |

(Continued)

FOREIGN PATENT DOCUMENTS

EP    1 328 033 A2    7/2003

(Continued)

OTHER PUBLICATIONS

Pauly, "Permeability and Diffusion Data", Polymer Handbook, pp. VI/543-VI/546, 1999.

(Continued)

*Primary Examiner*—Patrick Ryan
*Assistant Examiner*—Julian Mercado
(74) *Attorney, Agent, or Firm*—Fish & Richardson P.C.

(57) ABSTRACT

A cartridge includes a first housing, a second housing within the first housing, and a colorant. The first housing has an interior surface and an exterior surface, and the second housing contains an alcohol fuel or a hydrocarbon fuel and has an interior surface and an exterior surface. The colorant is supported by at least a portion of the interior surface of the first housing.

28 Claims, 11 Drawing Sheets

U.S. PATENT DOCUMENTS

| | | |
|---|---|---|
| 2003/0134162 A1 | 7/2003 | Gore et al. |
| 2004/0005496 A1 | 1/2004 | Kelley et al. |
| 2004/0072049 A1 | 4/2004 | Becerra et al. |
| 2004/0146769 A1 | 7/2004 | Birschbach |
| 2004/0209136 A1 | 10/2004 | Ren et al. |
| 2004/0229090 A1 | 11/2004 | Davis et al. |
| 2004/0229101 A1 | 11/2004 | Davis |
| 2005/0181258 A1 | 8/2005 | Gilicinski et al. |
| 2006/0051627 A1 | 3/2006 | Jiang et al. |
| 2006/0073371 A1 | 4/2006 | Drake et al. |
| 2007/0104995 A1 | 5/2007 | Kajitani et al. |

FOREIGN PATENT DOCUMENTS

| | | |
|---|---|---|
| WO | WO 02/099916 A2 | 12/2002 |
| WO | WO 2004/051781 A2 | 6/2004 |
| WO | WO2004/102717 A1 | 11/2004 |

OTHER PUBLICATIONS

Brandup, J. et al., eds. *Polymer Handbook* (4th Edition), John Wiley & Sons, Inc., 1999, pp. VI/543 to VI/546.

Robert Koch Industries, Colorsafe™ Stain Resistant Colorants, Price List, Jul. 1, 2004 (2 pages), http:/www.kochcolor.com/stainresistant.htm.

Robert Koch Industries, Dyes for Antifreeze and Windshield Wash Cleaner, Price List, Jul. 1, 2004 (3 pages), http:/www.kochcolor.com/antifreezewashdyes.htm.

Lamy, C. et al., "Direct Methanol Fuel Cells: From a Twentieth Century Electrochemist's Dream to a Twenty-first Century Emerging Technology", *Modern Aspects of Electrochemistry*, No. 34, Kluwer Academic/Plenum Publishers, New York, 2001, pp. 53-118.

Jarminie, J. et al., *Fuel Cell Systems Explained*, John Wiley & Sons, Ltd, West Sussex, England, 2000, pp. xi to 108.

Narayanan, S. et al., "Development of a Miniature Fuel Cell for Portable Applications", *Direct Methanol Fuel Cells, Electrochemical Society Proceedings*, 2001-4, Pennington, NJ, 2001.

Giner Electrochemical Systems, LLC, Press Release, Newton, MA, Jul. 2, 2002 (1 page).

Drake et al., U.S. Appl. No. 10/957,935, filed Oct. 4, 2004.

Jiang et al., U.S. Appl. No. 10/933,735, filed Sep. 3, 2004.

Biobliographic Information Retrieved from SciFinder (6 pages), Undated.

FUEL CELL WITH CARTRIDGE AND COLORANT

CROSS REFERENCE TO RELATED APPLICATIONS

This application is a divisional of and claims the benefit of priority under 35 U.S.C. §120 to U.S. application Ser. No. 11/137,848, filed on May 25, 2005 and now issued as U.S. Pat. No. 7,638,214. The contents of the parent application is hereby incorporated by reference in its entirety.

TECHNICAL FIELD

The invention relates to fuel cells, and to related methods.

BACKGROUND

A fuel cell is a device capable of providing electrical energy from an electrochemical reaction, typically between two or more reactants. Generally, a fuel cell includes two electrodes, called an anode and a cathode, and a solid electrolyte disposed between the electrodes. The anode contains an anode catalyst, and the cathode contains a cathode catalyst. The electrolyte, such as a membrane electrolyte, is typically ionically conducting but electronically non-conducting. The electrodes and solid electrolyte can be disposed between two gas diffusion layers (GDLs).

During operation of the fuel cell, the reactants are introduced to the appropriate electrodes. At the anode, the reactant(s) (the anode reactant(s)) interacts with the anode catalyst and forms reaction intermediates, such as ions and electrons. The ionic reaction intermediates can flow from the anode, through the electrolyte, and to the cathode. The electrons, however, flow from the anode to the cathode through an external load electrically connecting the anode and the cathode. As electrons flow through the external load, electrical energy is provided. At the cathode, the cathode catalyst interacts with the other reactant(s) (the cathode reactant(s)), the intermediates formed at the anode, and the electrons to complete the fuel cell reaction.

For example, in one type of fuel cell, sometimes called a direct methanol fuel cell (DMFC), the anode reactants include methanol and water, and the cathode reactant includes oxygen (e.g., from air). At the anode, methanol is oxidized; and at the cathode, oxygen is reduced:

  (1)

  (2)

  (3)

As shown in Equation (1), oxidation of methanol produces carbon dioxide, protons, and electrons. The protons flow from the anode, through the electrolyte, and to the cathode. The electrons flow from the anode to the cathode through an external load, thereby providing electrical energy. At the cathode, the protons and the electrons react with oxygen to form water (Equation 2). Equation 3 shows the overall fuel cell reaction.

SUMMARY

The invention relates to fuel cells, and to related methods.

In one aspect, the invention features a cartridge including a first housing, a second housing within the first housing, and a first colorant. The first housing has an interior surface and an exterior surface, and the first colorant is supported by at least a portion of the interior surface of the first housing. The second housing contains an alcohol fuel (e.g., methanol) or a hydrocarbon fuel and has an interior surface and an exterior surface.

In another aspect, the invention features a cartridge including a first housing, a second housing within the first housing, and a colorant. The first housing has an interior surface and an exterior surface. The second housing contains an alcohol fuel (e.g., methanol) or a hydrocarbon fuel and has an interior surface and an exterior surface. The colorant is supported by at least a portion of the exterior surface of the second housing.

In an additional aspect, the invention features a cartridge including a cartridge housing, a mixture within the cartridge housing, and a liquid-impermeable membrane. The mixture within the cartridge housing includes a first colorant and an alcohol fuel (e.g., methanol) or a hydrocarbon fuel.

In a further aspect, the invention features a method that includes flowing an alcohol fuel (e.g., methanol) or a hydrocarbon fuel from a cartridge to a fuel cell through a membrane. The cartridge contains a mixture of a first colorant and the alcohol fuel or the hydrocarbon fuel. Substantially all (e.g., at least about 95 percent, at least about 97 percent, at least about 99 percent, at least about 99.5 percent) of the first colorant remains in the cartridge while the alcohol fuel or the hydrocarbon fuel flows through the membrane.

In another aspect, the invention features a method that includes flowing an alcohol fuel (e.g., methanol) or a hydrocarbon fuel from a cartridge to a fuel cell through a membrane. The cartridge contains a mixture of a first colorant and the alcohol fuel or the hydrocarbon fuel, and the method further includes increasing the concentration of the first colorant in the mixture within the cartridge.

In an additional aspect, the invention features a method that includes flowing an alcohol fuel (e.g., methanol) or a hydrocarbon fuel from a cartridge to a fuel cell through a membrane. The cartridge contains a mixture of a first colorant and the alcohol fuel or the hydrocarbon fuel. The method further includes detecting a change (e.g., an increase) in the concentration of the first colorant in the membrane.

In a further aspect, the invention features a method that includes flowing an alcohol fuel (e.g., methanol) or a hydrocarbon fuel from a cartridge to a fuel cell through a membrane. The cartridge contains a mixture of a first colorant and the alcohol fuel or the hydrocarbon fuel, and the method further includes measuring the concentration of the first colorant in the mixture within the cartridge.

In a further aspect, the invention features a fuel cell stack that includes a colorant.

Embodiments can include one or more of the following features.

The cartridge and/or the mixture can further include a second colorant. The second colorant can be the same as the first colorant or can be different from the first colorant.

The colorant (e.g., the first colorant, the second colorant) can be supported by at least a portion of the interior surface of the first housing and/or by at least a portion of the exterior surface of the second housing. In certain embodiments, the colorant can contact the interior surface of the first housing and/or the exterior surface of the second housing. In some embodiments, the colorant can be in powder form. As an example, the colorant may be an ionic powder dye. In certain embodiments, the colorant can be in liquid form. As an example, the colorant may be a polymer-based liquid colorant or a water-based ink. In certain embodiments, the color of the colorant and/or the intensity of the color of the mixture can change (e.g., significantly enough to be visible to an observer)

when the weight percent of the alcohol fuel or the hydrocarbon fuel in the mixture decreases by at least about 50 weight percent (e.g., at least about 60 weight percent, at least about 70 weight percent, at least about 80 weight percent, at least about 90 weight percent).

In certain embodiments, the colorant in the fuel cell stack can be in the form of a layer on a surface (e.g., an interior surface) of the fuel cell stack. In certain embodiments, the fuel cell stack can include a chamber (e.g., an anode chamber) and/or a cathode plenum, and the colorant can be located in the chamber and/or the cathode plenum (e.g., in the form of a layer on an interior surface of the chamber and/or an interior surface of the cathode plenum).

In some embodiments, the mixture can include at most about one percent by weight (e.g., at most about 0.5 percent by weight), and/or at least about 0.1 percent by weight (e.g., at least about 0.5 percent by weight), of the colorant (e.g., the first colorant, the second colorant).

The membrane can be vapor-permeable and/or liquid-impermeable. In certain embodiments, the membrane can be impermeable to a colorant (e.g., the first colorant, the second colorant). The membrane can be a pervaporation membrane. The membrane can include silicone. In some embodiments, the membrane can include poly(dimethyl)silicone and/or poly(trimethyl)silyl propyne. The membrane can include a fluorocarbon polymer, polyethylene, polypropylene, a polycarbonate, a polyimide, a polysulfone, a polysulfide, a polyurethane, a polyester, cellulose (e.g., paper), or a combination thereof.

The method can further include measuring the concentration of the colorant (e.g., the first colorant) in the membrane and/or in the mixture within the cartridge. In some embodiments, measuring the concentration of the colorant in the mixture within the cartridge can include spectroscopically detecting the concentration of the colorant in the mixture within the cartridge.

Embodiments can include one or more of the following advantages.

The cartridge may be relatively safe to store, handle, and/or use. In some embodiments, the cartridge can provide a clear signal (e.g., a visual signal) of a fuel leak from the cartridge. Upon noticing this signal, a user of the cartridge can then respond accordingly (e.g., by taking appropriate safety measures).

In some embodiments, the cartridge may be used to supply a fuel cell in a portable device, such as a cellular telephone. The portable device may be able to run for a relatively long period of time before the cartridge needs to be replaced.

In some embodiments, the colorant may be soluble in a fuel contained in the cartridge. In some such embodiments, the fuel can quickly solubilize the colorant in the event of a fuel leak, and thereby promptly notify a user of the fuel leak. In certain embodiments, the colorant can be relatively stable (e.g., the colorant can be non-volatile). A relatively stable colorant may be capable of providing a signal of a fuel leak for a relatively long period of time (e.g., one month, two months, three months).

In certain embodiments, the cartridge can provide a signal (e.g., a visual signal) that can allow a user to relatively easily determine how much fuel remains in the cartridge. As a result, the user can plan for the timely replacement of the cartridge. In some embodiments, the signal can be provided regardless of the orientation of the cartridge.

The colorant can be relatively non-toxic and/or unlikely to cause stains (e.g., on clothes). In certain embodiments, the colorant can be removed from clothing simply by washing the clothing. In some embodiments, the colorant can be relatively inexpensive and/or readily available.

Other aspects, features, and advantages of the invention are in the drawings, description, and claims.

DETAILED DESCRIPTION

Figure 1:
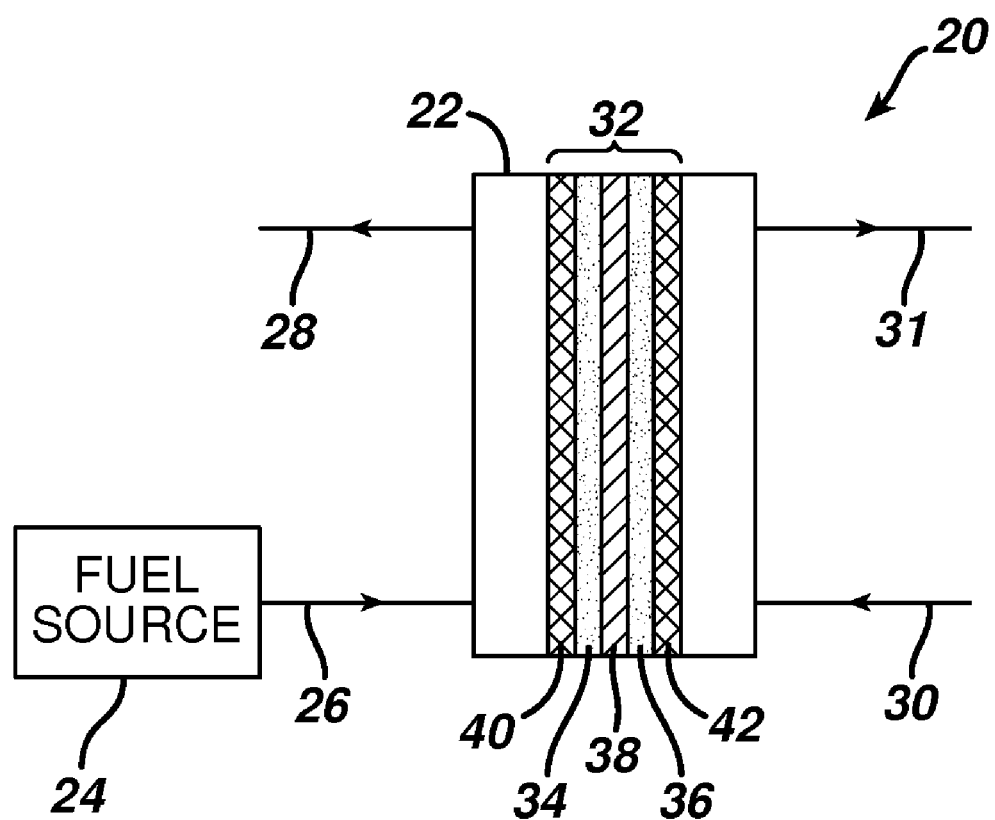
FIG. 1 is a schematic diagram of an embodiment of a fuel cell system.

Referring to FIG. 1, a fuel cell system 20, such as a direct methanol fuel cell (DMFC) system, is shown. Fuel cell system 20 includes a fuel cell stack 22, a fuel source 24 (e.g., a cartridge) in fluid communication with the fuel cell stack via a fuel inlet 26, a fuel outlet 28, a cathode reactant (e.g., air) inlet 30 in fluid communication with the fuel cell stack, and a cathode reactant outlet 31. For clarity, fuel cell stack 22 is shown having one fuel cell 32 (described below), but in other embodiments, the fuel cell stack includes a plurality of fuel cells (e.g., arranged in series or in parallel). Briefly, fuel cell 32 includes an anode 34 in fluid communication with fuel source 24, a cathode 36, and an electrolyte 38 between the anode and the cathode. Fuel cell 32 further includes two gas diffusion layers (GDL) 40 and 42, one disposed on each side of the electrolyte 38, anode 34, and cathode 36 assembly.

A fuel source such as fuel source 24 can provide a vapor phase fuel or a liquid fuel to a fuel cell or fuel cell stack. In some embodiments, a fuel source can include a rigid fuel composition that is capable of delivering a vapor phase fuel (e.g., methanol vapor) to a fuel cell or fuel cell stack. The fuel composition can be prepared from a liquid precursor composition that includes methanol (a fuel), a polymerizable material (e.g., an inorganic polymer, an organic polymer, or a hybrid thereof), and one or more catalysts (e.g., a dilute acid solution such as 0.10N $H_2SO_4$, a dilute base solution such as 0.10N KOH, HCl, $HNO_3$, an organic acid, an organic amine). The liquid precursor composition can be rigidified, for example, by heat curing the composition to form a rigid polymeric network in which methanol is trapped in interstices defined by the polymeric network. In certain embodiments, a fuel source can include a rigid fuel composition that includes a fuel (e.g., methanol) rigidified in a cross-linked silica network.

In some embodiments, a fuel source can include a fuel that is in a non-gaseous form (e.g., a liquid or a gel) and that has a vapor pressure sufficient to provide a vapor phase fuel to a fuel cell or fuel cell stack. A fuel gel is a viscous material (e.g., from about 0.05 centipoises to about 200,000 centipoises) capable of emitting a pure and high concentration of vapor-phase fuel molecules. The viscosity can be, for example, at least about 10,000 centipoises (e.g., at least about 25,000 centipoises, at least about 50,000 centipoises, at least about 100,000 centipoises, at least about 150,000 centipoises), and/or at most about 200,000 centipoises (e.g., at most about 150,000 centipoises, at most about 100,000 centipoises, at most about 50,000 centipoises, at most about 25,000 centipoises). An example of a fuel gel composition includes a fuel (e.g., methanol), a diluent (e.g., deionized water), a thickener (e.g., hydroxypropyl cellulose thickener, Carbopol EZ-3 (an acidic, hydrophobically-modified, cross-linked polyacrylate powder)), and a neutralizing agent (e.g., tri-isopropanolamine). Other fuel gels are described in literature from Noveon that describe examples of the use of Carbopol rheology modifiers (manufactured by BF Goodrich), and are exemplified by cooking fuels (e.g., available from Sterno, and formulation examples listed by Noveon). A liquid fuel can include pure methanol, or a solution including methanol and water and/or gelling agent as non-fuel components. In some embodiments, a fuel can further include additives, such as ethanol, ethylene glycol, and/or formic acid, and fuel components.

Figure 2:
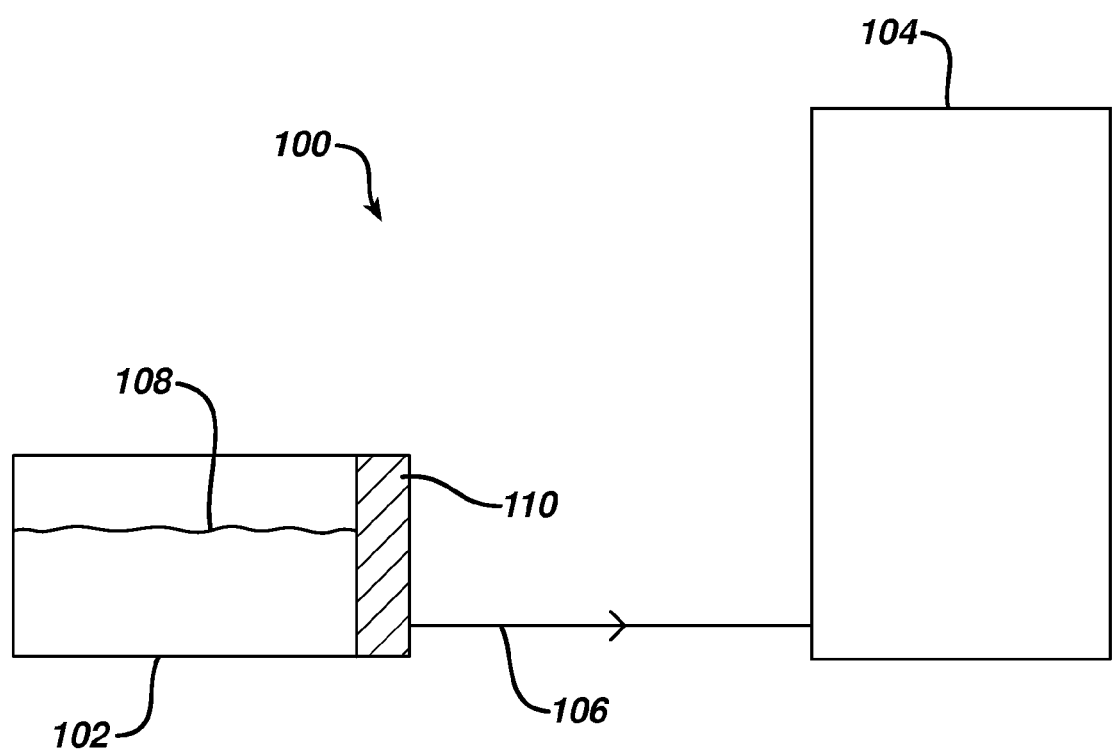
FIG. 2 is a schematic diagram of an embodiment of a fuel cell system.

In certain embodiments, a fuel source can include a liquid fuel that is converted into a vapor phase fuel by being passed through a pervaporation membrane or membrane delivery film. For example, FIG. 2 shows a fuel cell system 100 that includes a fuel source 102 containing a liquid fuel 108 and including a pervaporation membrane 110. Fuel cell system 100 also includes a fuel cell stack 104. Fuel source 102 is in fluid communication with fuel cell stack 104 via a fuel inlet 106. As fuel 108 exits fuel source 102, fuel 108 passes through pervaporation membrane 110, which converts fuel 108 from a liquid fuel to a vapor phase fuel. The resulting fuel vapor then travels through fuel inlet 106 to fuel cell stack 104.

Pervaporation membrane 110 can include, for example, one or more polymers. In certain embodiments, pervaporation membrane 110 can be formed of a non-porous film of silicone. In some embodiments, pervaporation membrane 110 can be formed of one or more dense polymers that enable methanol to pervaporate, such as poly(trimethyl)silyl propyne (PTMSP), poly(dimethyl)silicone (PDMS), and/or a polyurethane. In certain embodiments, pervaporation membrane 110 can further include a support (e.g., a porous support). The support can, for example, provide rigidity to pervaporation membrane 110. In some embodiments, the support can include one or more polymers. Examples of polymers that may be included in the support include polyolefins, polyurethanes, and polyacrylonitrile.

Pervaporation membrane 110 can have a thickness of at least about one micron (e.g., at least about five microns, at least about 10 microns, at least about 25 microns, at least about 50 microns, at least about 75 microns, at least about 100 microns, at least about 125 microns, at least about 150 microns, at least about 175 microns), and/or at most about 200 microns (e.g., at most about 175 microns, at most about 150 microns, at most about 125 microns, at most about 100 microns, at most about 75 microns, at most about 50 microns, at most about 25 microns, at most about 10 microns, at most about five microns). For example, pervaporation membrane 110 may have a thickness of about 127 microns (five mil). Pervaporation membranes are described, for example, in U.S. Patent Application Publication No. US 2004/0209136 A1, published on Oct. 21, 2004, which is hereby incorporated by reference in its entirety.

As noted above, in certain embodiments, a fuel source can provide a liquid fuel to a fuel cell or fuel cell stack. The liquid fuel can travel from the fuel source through a fuel inlet, entering the fuel cell or fuel cell stack and eventually directly contacting a fuel cell anode. In some embodiments, the liquid fuel can pass through one or more filters prior to contacting the anode. The filter may be, for example, a cellulosic filter and/or a molecular sieve. In certain embodiments, the filter can include activated charcoal.

A fuel source such as fuel source 24 (FIG. 1) can contain one or more fuels. Examples of fuels include alcohols (e.g., methanol, ethanol, isopropanol), ethylene glycol, formic acid, and other oxidizable hydrocarbons. In certain embodiments, a fuel source can include neat (99.5 percent) methanol. As noted above, in some embodiments, a fuel source can include a fuel mixed with water. For example, a fuel source can include methanol and water. The methanol can be, for example, from about 85 percent by weight to about 95 percent by weight (e.g., about 90 percent by weight) of the mixture. In some embodiments, a fuel source can include more than one type of fuel. For example, a fuel source can include a mixture of methanol and ethanol. Fuel sources and fuels are described, for example, in U.S. Ser. No. 10/933,735, filed on Sep. 3, 2004, and entitled "Fuel Compositions", and in U.S. Ser. No. 10/957,935, filed on Oct. 4, 2004, and entitled "Fuel Sources, Fuel Cells and Methods of Operating Fuel Cells", both of which are hereby incorporated by reference.

Figure 3A:
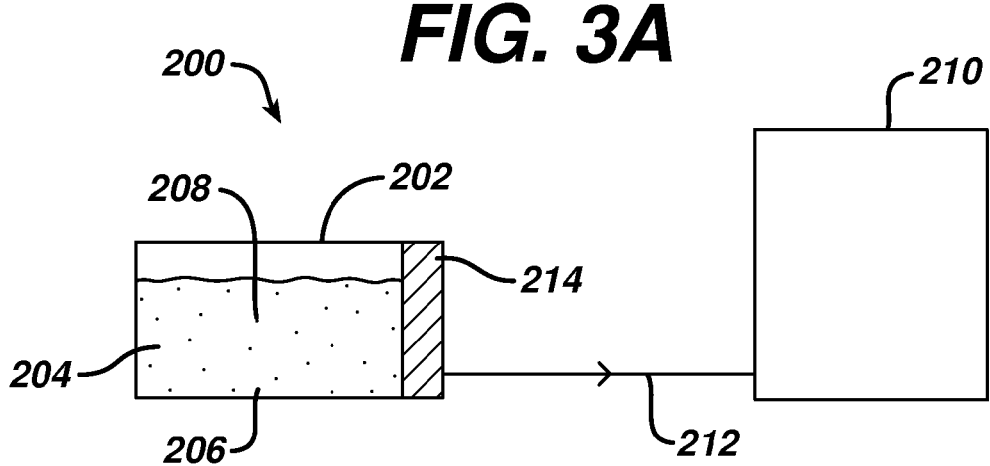
FIGS. 3A-3C illustrate the operation of an embodiment of a fuel cell system.
Figure 3B:
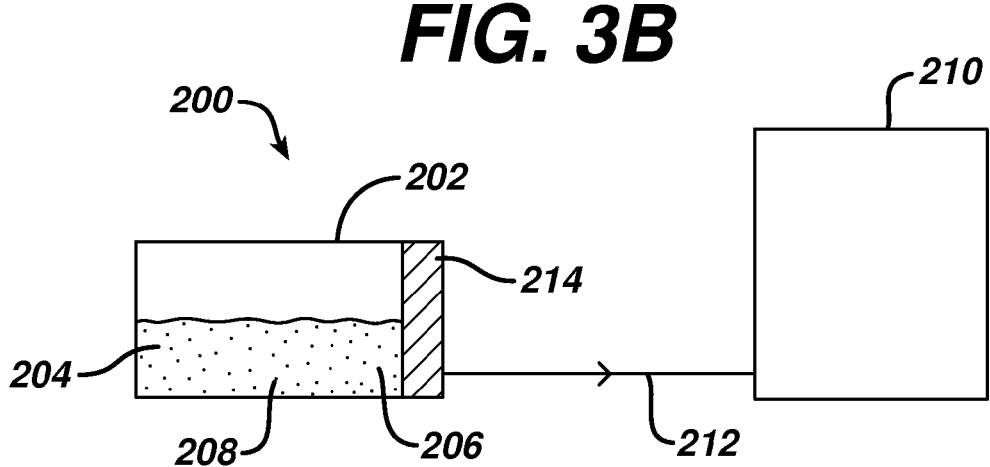
Figure 3C:
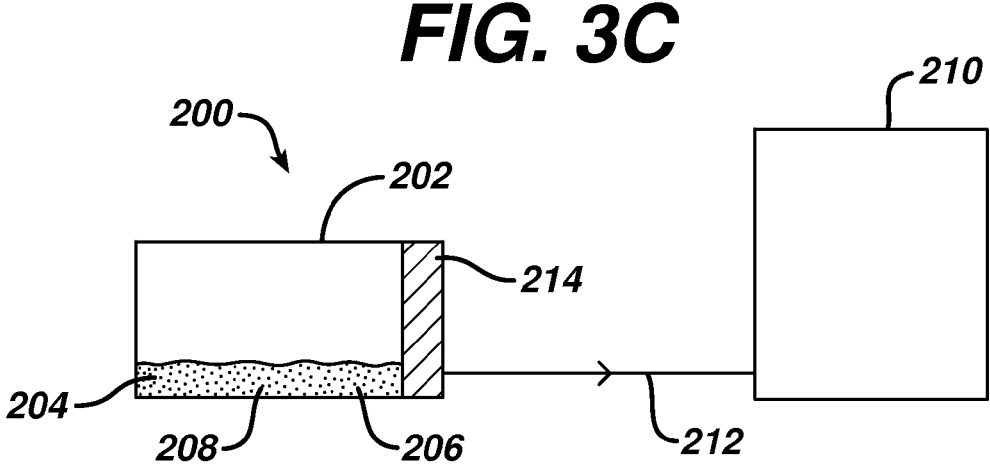

As shown in FIGS. 3A-3C, in some embodiments, a fuel cell system can provide a visual signal (e.g., to a user) of the amount of fuel remaining in its fuel source. FIGS. 3A-3C show a fuel cell system 200 including a fuel source 202 that contains a mixture 204 of a fuel 206 and a colorant 208. Fuel source 202 further includes a pervaporation membrane 214. Fuel cell system 200 also includes a fuel cell stack 210 and a fuel inlet 212 connecting fuel source 202 to fuel cell stack 210. As mixture 204 crosses pervaporation membrane 214, the pervaporation membrane converts fuel 206 from a liquid into a vapor. Fuel 206 then enters fuel inlet 212 in a vapor phase and travels toward fuel cell stack 210.

While pervaporation membrane 214 is permeable to fuel 206, pervaporation membrane 214 is impermeable to colorant 208. As a result, colorant 208 remains in fuel source 202. Thus, as fuel 206 is consumed during use of fuel cell stack 210, the concentration of colorant 208 in mixture 204 in fuel source 202 increases. For example, FIG. 3A shows fuel source 202 when it contains a relatively high amount of fuel 206 (e.g., at the beginning of operation of fuel cell stack 210). Thus, the concentration of colorant 208 in mixture 204 is relatively low. However, as fuel 206 is consumed during operation of fuel cell system 200, the concentration of colorant 208 in mixture 204 increases. For example, FIG. 3B shows fuel cell system 200 when fuel source 202 includes an intermediate amount of fuel 206, and FIG. 3C shows fuel cell system 200 when fuel source 202 includes a low amount of fuel 206. This increase in the concentration of colorant 208 in mixture 204 can cause the color of mixture 204 to change in intensity (from a lighter shade to a darker shade). For example, in some embodiments, mixture 204 may change from pale yellow to dark yellow. This change in the intensity of the color of mixture 204 can provide a visual signal of the amount of fuel remaining in fuel source 202.

In some embodiments, the concentration of colorant in mixture 204 can increase by at least about two-fold (e.g., at least about five-fold, at least about 10-fold, at least about 50-fold, at least about 100-fold, at least about 500-fold, at least about 1000-fold, at least about 5000-fold, at least about 10.000-fold, at least about 50.000-fold), and/or at most about 100.000-fold (e.g., at most about 50.000-fold, at most about 10.000-fold, at most about 5000-fold, at most about 1000-fold, at most about 500-fold, at most about 100-fold, at most about 50-fold, at most about 10-fold, at most about five-fold) during use of fuel cell stack 210.

In certain embodiments (e.g., prior to use of fuel cell stack 210), mixture 204 can include at most about one percent by weight (e.g., at most about 0.5 percent by weight), and/or at least about 0.1 percent by weight (e.g., at least about 0.5 percent by weight), of colorant 208. In some embodiments (e.g., when colorant 208 is a powder colorant), mixture 204 can include at most about 100 ppm (e.g., about 67 ppm) of colorant 208. In certain embodiments, such as during or after use of fuel cell stack 210, mixture 204 can include at most about 100 percent by weight (e.g., at most about 50 percent by weight, at most about 25 percent by weight, at most about 10 percent by weight, at most about five percent by weight, at most about one percent by weight, at most about 0.5 percent by weight), and/or at least about 0.02 percent by weight (e.g., at least about 0.5 percent by weight, at least about one percent by weight, at least about five percent by weight, at least about 10 percent by weight, at least about 25 percent by weight, at least about 50 percent by weight), of colorant 208.

Figure 4A:
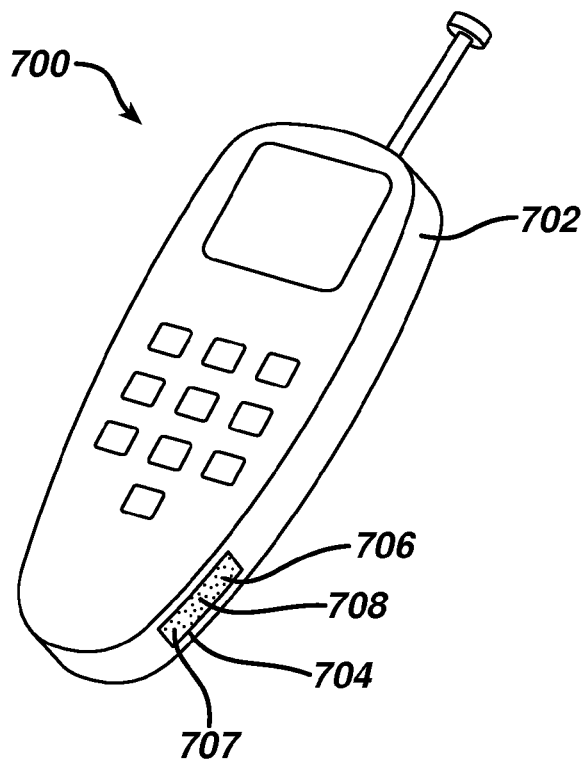
FIGS. 4A and 4B are perspective views of an embodiment of a cellular telephone.
Figure 4B:
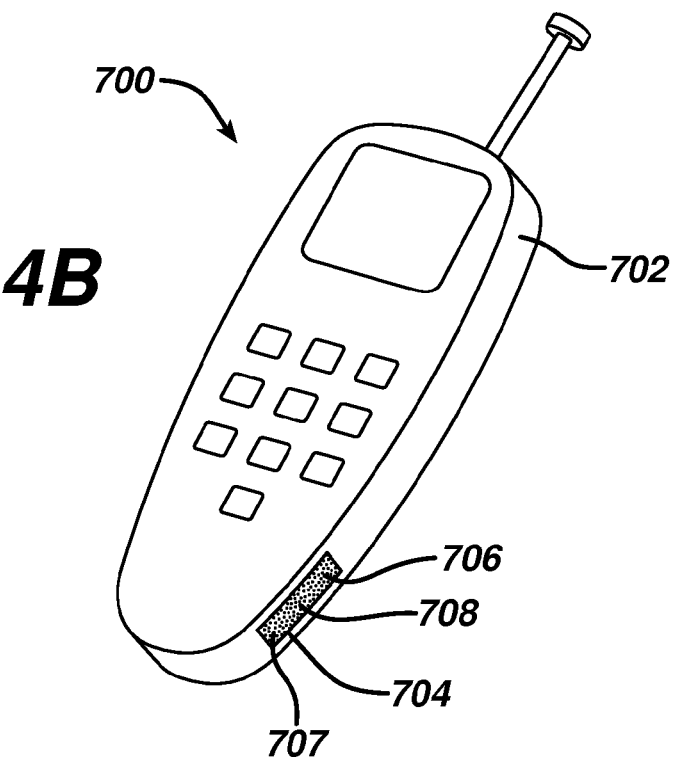

In some embodiments, a user can relatively easily view a change in the intensity of the color of mixture 204 as fuel 206 is being consumed. For example, FIG. 4A shows a cellular telephone 700 including a housing 702. Housing 702 includes a window 704 that displays the contents of a fuel source (not shown) within the housing. The fuel source contains a fuel mixture 708 including a colorant 706 and fuel 707. FIG. 4A shows cellular telephone 700 when the fuel source contains a relatively high amount of fuel. Thus, the concentration of colorant 706 in fuel mixture 708 is relatively low. However, FIG. 4B shows cellular telephone 700 when the amount of fuel in the fuel source is relatively low, and the concentration of colorant 706 in fuel mixture 708 is, therefore, relatively high. This change in concentration can provide a user with a visual signal of the amount of fuel remaining in the fuel source.

Figure 4C:
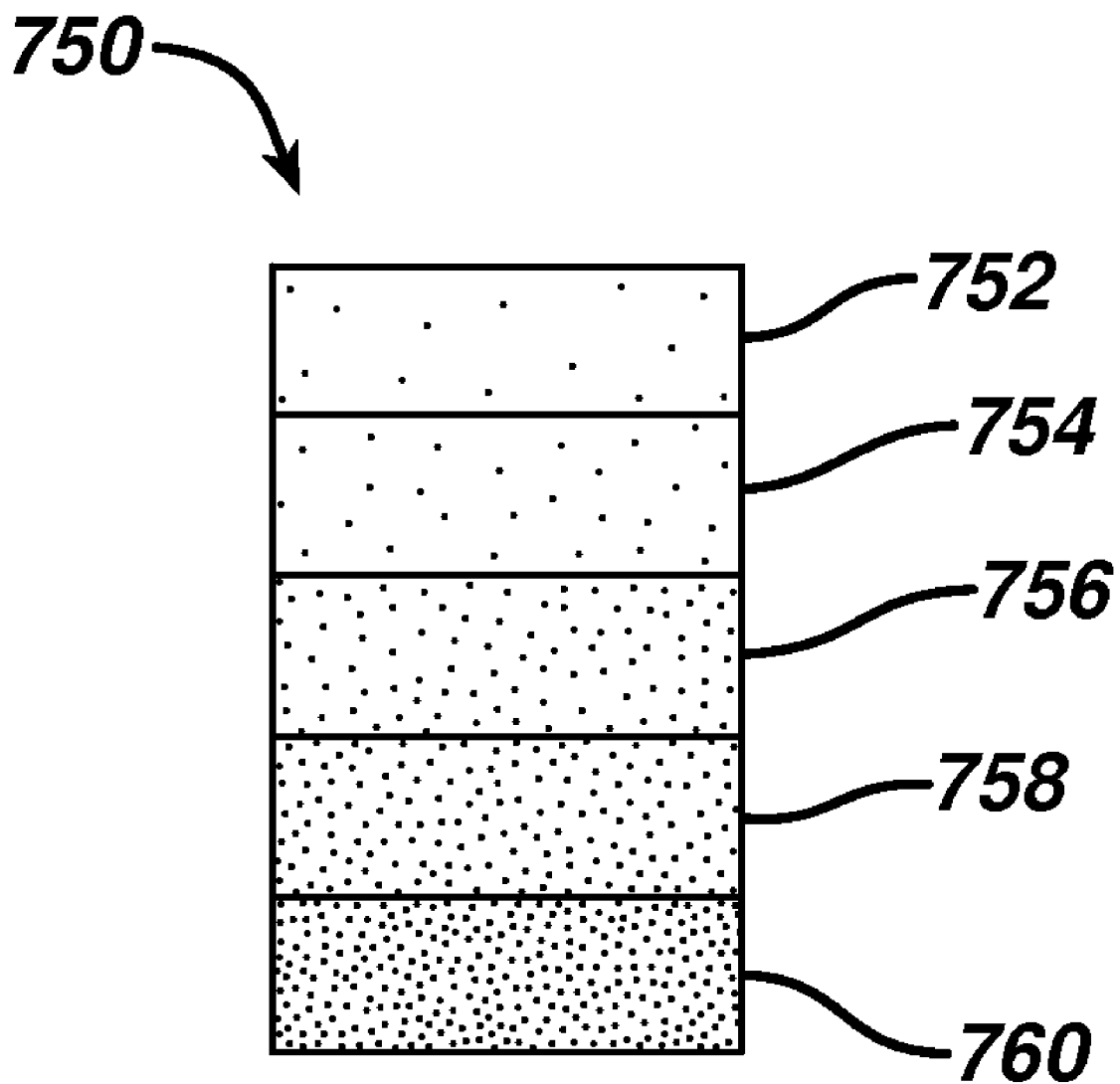
FIG. 4C is an illustration of an embodiment of a fuel amount chart.

In some embodiments, a table of color shades may be provided with an electronic device (e.g., a portable electronic device) such as cellular telephone 700, so that a user can relatively easily ascertain the amount of fuel remaining in the device's fuel source. For example, FIG. 4C shows a table 750 that displays five different shades 752, 754, 756, 758, and 760, of a fuel mixture color. Shade 752 indicates 100 percent of fuel remaining in the fuel source, shade 754 indicates 80 percent remaining, shade 756 indicates 60 percent remaining, shade 758 indicates 40 percent remaining, and shade 760 indicates 20 percent remaining.

Figure 5A:
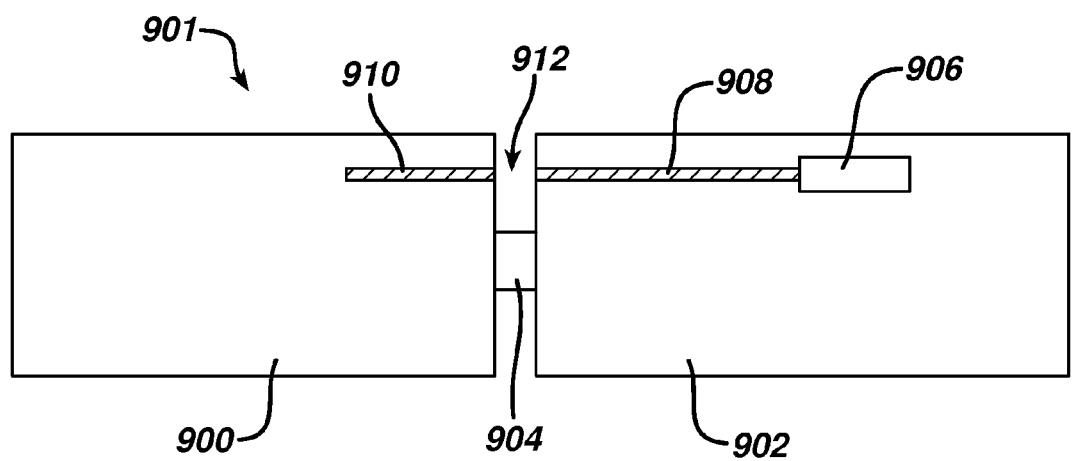
FIG. 5A is a schematic diagram of an embodiment of an apparatus for measuring colorant concentration.

In certain embodiments, spectroscopy can be used to indicate the amount of fuel remaining in a fuel source. As an example, FIG. 5A shows a fuel cell system 901 including a fuel source 900 connected to a fuel cell 902 by a fuel inlet 904. Fuel cell 902 includes a visible-region spectrophotometer 906 and an optical fiber 908 extending from spectrophotometer 906. Fuel source 900 includes an optical fiber 910. During operation, spectrophotometer 906 sends out an input excitation signal which travels along optical fiber 908, across a gap 912 between fuel source 900 and fuel cell 902, and along optical fiber 910. Spectrophotometer 906 then receives a reflected measurement signal, which can be used to determine the amount of fuel in fuel source 900.

Figure 5B:
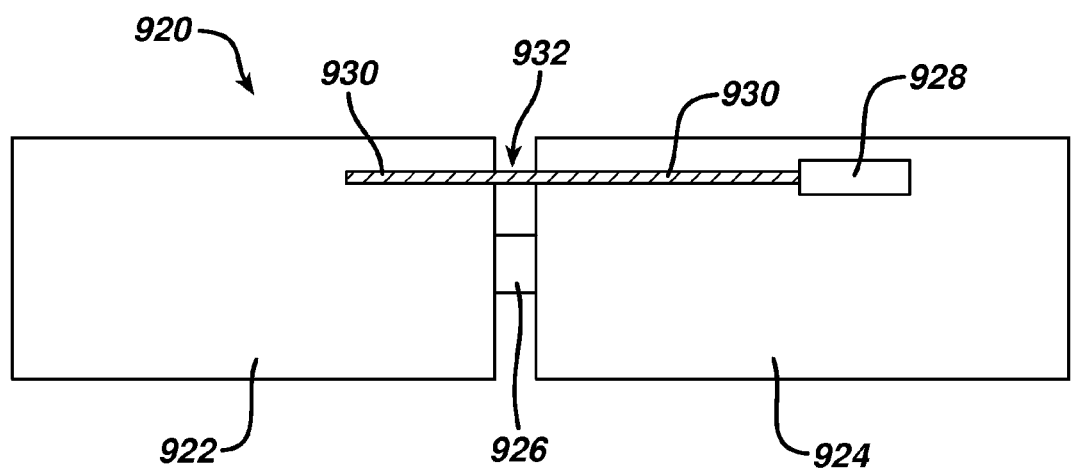
FIG. 5B is a schematic diagram of an embodiment of an apparatus for measuring colorant concentration.

While a fuel cell system with a fuel source and a fuel cell having separate optical fibers has been shown, in some embodiments, a fuel cell system can include a fuel source and a fuel cell that are connected by one optical fiber. For example, FIG. 5B shows a fuel cell system 920 including a fuel source 922 connected to a fuel cell 924 by a fuel inlet 926. Fuel cell 924 includes a spectrophotometer 928 from which an optical fiber 930 extends. Optical fiber 930 extends through fuel cell 924, across a gap 932 between fuel cell 924 and fuel source 922, and into fuel source 922.

As shown in FIGS. 5A and 5B, in certain embodiments, a fuel cell can include a spectrophotometer. In some embodiments, a fuel source may be used to supply a fuel cell and then may be replaced by another fuel source (e.g., when the first fuel source has run out of fuel). In some such embodiments, including the spectrophotometer in the fuel cell can allow the same spectrophotometer to be used to measure the amount of fuel remaining in multiple different fuel sources that are used to supply the fuel cell.

Figure 5C:
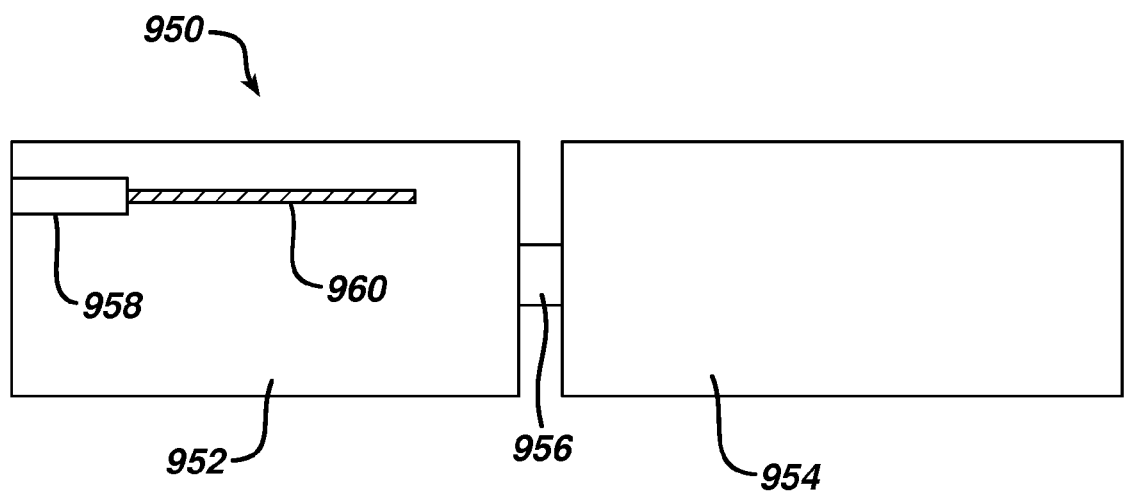
FIG. 5C is a schematic diagram of an embodiment of an apparatus for measuring colorant concentration.

While fuel cells including spectrophotometers have been shown, in certain embodiments, a fuel source can include a spectrophotometer. For example, FIG. 5C shows a fuel cell system 950 including a fuel source 952 connected to a fuel cell 954 by a fuel inlet 956. Fuel source 952 includes a spectrophotometer 958, from which an optical fiber 960 extends. Spectrophotometer 958 and optical fiber 960 can be used to measure the amount of fuel remaining in fuel source 952.

In some embodiments, both a fuel source and a fuel cell in a fuel cell system can include spectrophotometers.

A fuel mixture can include any of a number of different colorants. In some embodiments, a fuel mixture can include multiple (e.g., two, three, four, five) colorants. In certain embodiments, the colorant(s) may be relatively unlikely to cause stains (e.g., on clothing) in the event of a leak, and/or may be non-toxic. The colorant(s) can have a pH of, for example, from about 5.5 to about 8.5 (e.g., from about 6.0 to about 8.5, from about 6.0 to about 6.5). The colorant(s) can be ionic, or can be non-ionic.

In some embodiments, a colorant can be in powder form. In certain embodiments, a powder colorant can be non-volatile. Examples of powder colorants include ionic powder dyes, such as ionic powder dyes that can be used in antifreeze and/or in windshield wash cleaners. Examples of commercially available powder colorants include the following colorants, all available from Robert Koch Industries Inc. (Bennett, Colo.): Hi-pH Uranine 6313, Hi-pH Pyranine 6314, Hi-pH Light Green 6230, Brilliant Green AF 2339, Hi-pH Brilliant Green 6228, Emerald Green AF 2344, Hi-pH Fluorite Green 6235, Hi-pH Dark Green 6250, Hi-pH Aqua 6271, Blue Lace 2321, Hi-pH Blue 6010, Hi-pH True Blue 6020, Brilliant Blue 2649, Hi-pH Yellow 6505, Hi-pH Golden Yellow 6528, Hi-pH Red 6365, Hi-pH Ruby Red 6345, Antifreeze Red 2529, and Brilliant Orange 2258.

In certain embodiments, a colorant can be in liquid form (e.g., in liquid concentrate form). In some embodiments, the colorant can be a water-based ink, such as an alkali-soluble and/or ammonium-containing water-based ink. In certain embodiments, a liquid colorant can be non-volatile, and/or can be combined with one or more solvents (e.g., propanol, propylene glycol, dimethylethanolamine, water) to form a colorant solution. In some embodiments, a liquid colorant can include one or more polymers. Examples of commercially available colorant solutions formed of a solvent and a liquid include the following Colorsafe™ Stain Resistant Colorants, all available from Robert Koch Industries Inc. (Bennett, Colo.): Azure Blue 3021 Liquid, Royal Blue 3027 Liquid, Pink 3306 Liquid, Red 3326 Liquid, Red St 3320 Liquid, Hot Magenta 3328 Liquid, Kelly Green 3226 Liquid, Brilliant Orange 3425, Teal 3291 Liquid, Yellow 3516 Liquid, Sundrop Yellow 3518 Liquid, and Violet 3146 Liquid.

In some embodiments, a colorant solution can be formed of one or more powder colorants and one or more solvents. Examples of commercially available colorant solutions formed of a solvent and a powder colorant include the following, all available from Robert Koch Industries Inc. (Bennett, Colo.): Brilliant Orange 2257 15% Liquid, Hi-pH Hot Pink 6326 20% Liquid, Hi-pH Uranine 6312 40% Liquid, Hi-pH Blue 6011 25% Liquid, Brilliant Blue 2651 20% Liquid, and Blue Lace 4325 50% Liquid.

Other examples of commercially available colorant solutions include the following water-based inks, all available from Environmental Inks and Coatings® (Morganton, N.C.): Poly Screen ES Process Blue FR (Product PSX10200), Poly Screen ES DNA Orange FR (Product PSX10320), and Aqua Max Fluorescent 804 Orange (Product Code AMFSO804).

In certain embodiments, a colorant or colorant solution can be soluble in one or more fuels (e.g., methanol), in water, and/or in alkali solution (e.g., soapy water). Examples of colorant solutions that are soluble in methanol include all of the above-described colorant solutions that are commercially available from Robert Koch Industries Inc. and from Environmental Inks and Coatings®. Examples of colorant solutions that are soluble in water include the following, all available from Robert Koch Industries Inc. (Bennett, Colo.): Azure Blue 3021 Liquid, Royal Blue 3027 Liquid, Pink 3306 Liquid, Red 3326 Liquid, Red St 3320 Liquid, Hot Magenta 3328 Liquid, Kelly Green 3226 Liquid, Brilliant Orange 3425, Teal 3291 Liquid, Yellow 3516 Liquid, Sundrop Yellow 3518 Liquid, and Violet 3146 Liquid. In some embodiments, a colorant or a colorant solution may be substantially insoluble in water.

Figure 6:
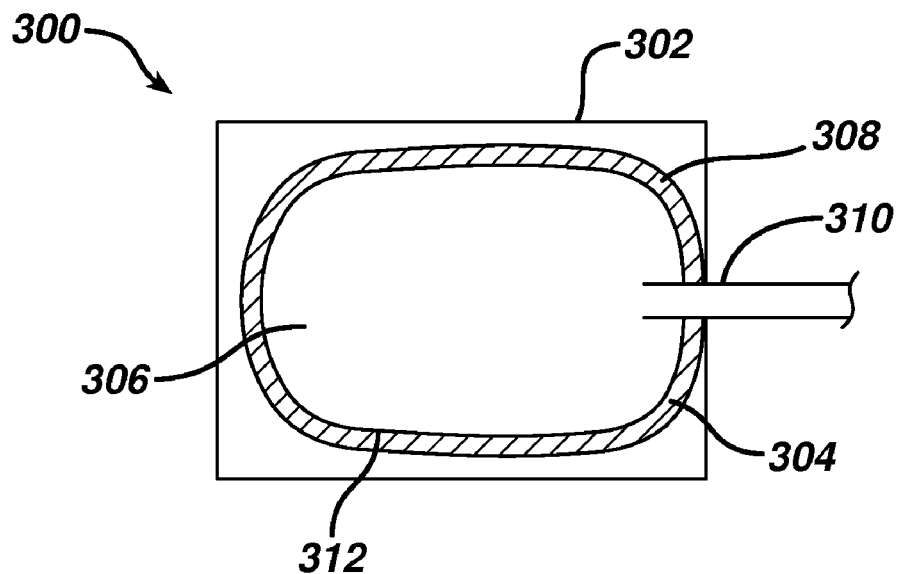
FIG. 6 is a side cross-sectional view of an embodiment of a fuel source.

While the use of a colorant for signaling the amount of fuel remaining in a fuel source has been described, in some embodiments, a colorant can be used for other purposes. As an example, in certain embodiments, one or more colorants can be used to indicate when fuel is leaking from a fuel source. For example, FIG. 6 shows a fuel source 300 including an outer housing 302 and an inner housing 304 within the outer housing. Outer housing 302 and/or inner housing 304 may be formed of, for example, one or more metals and/or plastics. In certain embodiments, inner housing 304 may be relatively flexible (e.g., inner housing 304 may be in the form of a flexible bladder). Inner housing 304 contains a fuel 306. A fuel inlet 310 extends through both outer housing 302 and inner housing 304, and is in fluid communication with fuel 306. On its exterior surface 312, inner housing 304 has a coating 308 that includes a colorant. If fuel 306 leaks from inner housing 304 and/or fuel outlet 310 and contacts coating 308, then the fuel will mix with the colorant in the coating, so that the fuel becomes colored and the fuel leak thereby is visible.

Figure 7:
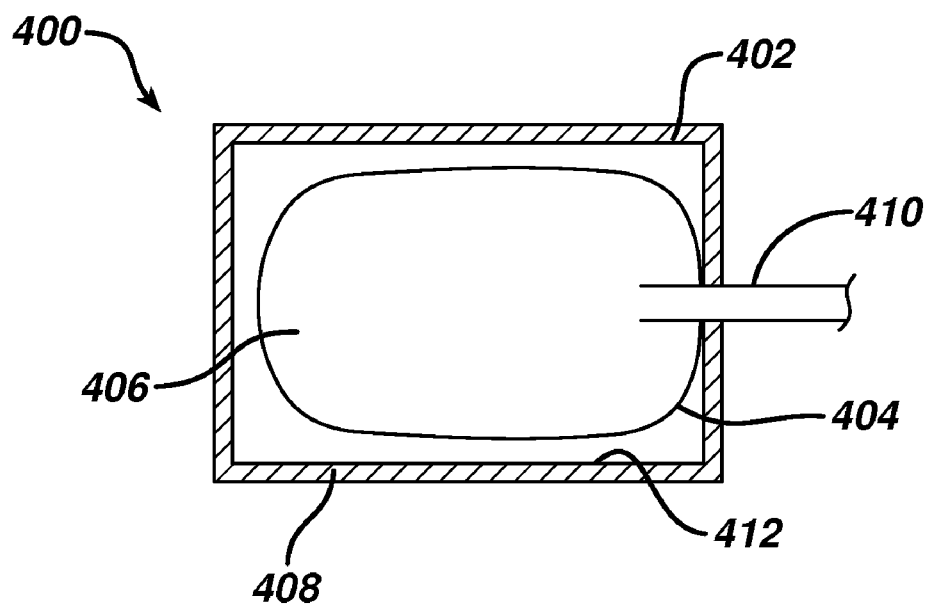
FIG. 7 is a side cross-sectional view of an embodiment of a fuel source.

While a coated inner housing has been shown, in some embodiments, a fuel source can alternatively or additionally include a coating in a different area of the fuel source. As an example, FIG. 7 shows a fuel source 400 including an outer housing 402 and an inner housing 404 within the outer housing. Inner housing 404 contains a fuel 406. A fuel inlet 410 extends through both outer housing 402 and inner housing 404, and is in fluid communication with fuel 406. On its interior surface 412, outer housing 402 has a coating 408 that includes a colorant.

Figure 8:
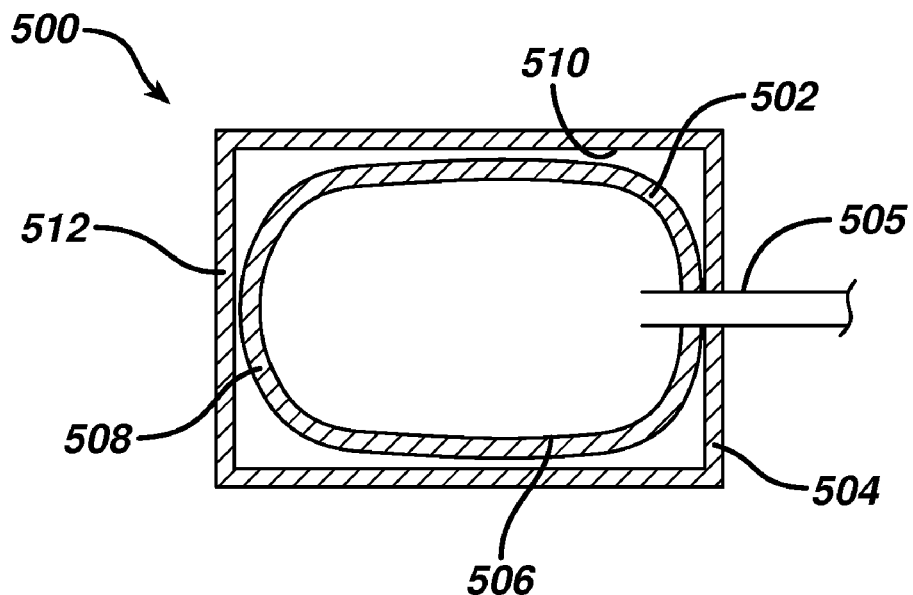
FIG. 8 is a side cross-sectional view of an embodiment of a fuel source.

As another example, FIG. 8 shows a fuel source 500 with an inner housing 502, an outer housing 504, and a fuel inlet 505. On its exterior surface 506, inner housing 502 has a coating 508 that includes a colorant, and on its interior surface 510, outer housing 504 has a coating 512 that includes a colorant. Coatings 508 and 512 can include the same colorant or different colorants.

Figure 9:
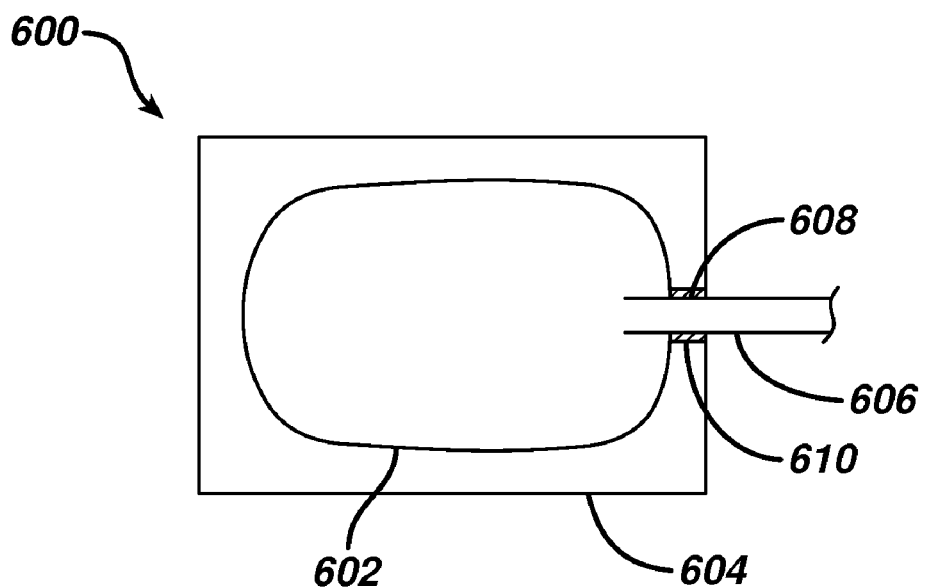
FIG. 9 is a side cross-sectional view of an embodiment of a fuel source.

As a further example, FIG. 9 shows a fuel source 600 with an inner housing 602, an outer housing 604, and a fuel outlet 606. A portion of exterior surface 608 of fuel outlet 606 is coated with a coating 610 that includes a colorant.

In some embodiments, a coating on a fuel source can be relatively thin (e.g., so that a relatively high amount of fuel can be included in the fuel source while still allowing for leak detection). In certain embodiments, a coating can have a thickness of at least about 0.5 micron (e.g., at least about one micron, at least about two microns, at least about five microns, at least about six microns, at least about 10 microns, at least about 15 microns, at least about 20 microns), and/or at most about 25 microns (e.g., at most about 20 microns, at most about 15 microns, at most about 10 microns, at most about six microns, at most about five microns, at most about two microns, at most about one microns). For example, a coating may have a thickness of from about two microns to about six microns (e.g., from about three microns to about six microns). In certain embodiments, a coating including a powder colorant may have a thickness of about six microns, and/or a coating including a liquid colorant may have a thickness of from about two microns to about three microns.

A coating on a fuel source may occupy a relatively small amount of the volume of the fuel source. In certain embodiments, a coating that includes a colorant can occupy less than about one percent by volume (e.g., less than about 0.5 percent by volume, less than about 0.3 percent by volume, less than about 0.1 percent by volume) of a fuel source. In some embodiments, a fuel source (e.g., a fuel source having a volume of less than about 40 cubic centimeters) can include at most about 100 milligrams (e.g., at most about 75 milligrams, at most about 50 milligrams, at most about 25 milligrams) of a colorant or colorants.

A coating including a colorant can be formed in any of a number of different ways. In some embodiments, a coating can be formed of a powder including one or more colorants. The powder can be coated on a fuel source using, for example, an electrostatic spray coating method. In certain embodiments, the powder can be applied to a fuel source by binding the powder in a polymer matrix and coating the fuel source with the resulting polymer composite. In some embodiments, the powder can be applied to a fuel source by mixing the powder with a tackifier and/or an adhesive, and coating (e.g., spraying) the fuel source with the resulting mixture. Examples of tackifiers include rosins, hydrocarbon resins, and terpene resins. Examples of rosins include partially hydrogenated rosins. Other examples of rosins include fully hydrogenated rosins, such as Foral 85-E or Foralyn 90 (both available from Eastman Chemical). Examples of hydrocarbon resins include aromatic resins (e.g., PLASTOLYN™ hydrocarbon resins or ENDEX™ hydrocarbon resins, both available from Eastman Chemical), mixes of aliphatic/aromatic feedstock resins (e.g., Picco HM100, available from Eastman Chemical), and hydrogenated hydrocarbon resins. Examples of resins that may be used, for example, as tackifiers on a polyolefin surface include relatively non-reactive tackifier resins, such as EASTOTAC™ hydrocarbon resins and REGALITE™ hydrocarbon resins (both available from Eastman Chemical). Examples of adhesives include adhesive polymers, such as epoxy systems, ethylene/vinyl acetate, and polyvinyl alcohol-based adhesives. In certain embodiments, the mixture (including a powder and a tackifier and/or an adhesive) can be cured (e.g., thermally cured) as it is being coated on the fuel source and/or after it has been coated on the fuel source. In some embodiments, the mixture may be sprayed with a thin polymeric coating after the mixture has been coated on the fuel source. The thin polymeric coating may, for example, reduce the tackiness of the coating of the mixture. In certain embodiments, the powder can be applied to the fuel source by coating particles with the powder and then applying the particles to the fuel source (e.g., using spraying methods). Examples of particles include carbon black particles (e.g., MONARCH® or BLACK PEARLS® products from Cabot), silicon particles (e.g., SNOWTEX® from Nissan Chemical), and metal oxide particles (e.g., ALUMINASOL™ from Nissan Chemical). In some embodiments, a powder colorant may account for less than about one percent by weight (e.g., less than about 0.5 percent by weight, less than about 0.1 percent by weight, less than about 0.05 percent by weight) of a coating.

While powder colorants have been described, in certain embodiments, a liquid colorant can be used to coat a fuel source. For example, in some embodiments, a coating can be formed by mixing a liquid concentrate colorant and a solvent. The coating can, for example, include less than about one percent by weight (e.g., less than about 0.5 percent by weight, less than about 0.3 percent by weight, less than about 0.1 percent by weight, less than about 0.05 percent by weight) of the liquid colorant.

In some embodiments, a coating can be formed by applying a colorant solution including one or more powder and/or liquid colorants and one or more solvents to a fuel source. Examples of solvents include fuels (e.g., methanol), water, or other liquids in which the colorant is soluble. In certain embodiments, the solvent may evaporate from the solution after the solution has been applied to the fuel source.

A coating that includes a colorant can be added to a fuel source using, for example, dipping, spraying, and/or spreading methods. In some embodiments, the coating can be allowed to dry on the fuel source at a temperature of about 25° C. after application to the fuel source. In certain embodiments, a coating can be heated after being added to a fuel source. For example, a liquid coating can be heated so that it dries on the fuel source. The coating can be heated at a temperature of, for example, at least about 30° C. (e.g., at least about 40° C., at least about 50° C., at least about 75° C., at least about 100° C., at least about 125° C., at least about 150° C., at least about 175° C., at least about 190° C.) and/or at most about 200° C. (e.g., at most about 190° C., at most about 175° C., at most about 150° C., at most about 125° C., at most about 100° C., at most about 75° C., at most about 50° C., at most about 40° C.). In some embodiments, heating a coating formed of a colorant solution may increase the rate of evaporation of solvent in the solution. In certain embodiments, a colorant coating can be spread while the colorant coating is drying on a fuel source (e.g., in order to limit or prevent coating droplet accumulation on the surface of the fuel source).

Colorants that are used in a coating can be, for example, any of the colorants provided above with reference to fuel amount detection. In some embodiments, a coating that includes a colorant may be non-volatile.

Referring back to FIG. 1, an example of fuel cell 32 will now be described. Fuel cell 32 includes electrolyte 38, anode 34 bonded on a first side of the electrolyte, and cathode 36 bonded on a second side of the electrolyte. Electrolyte 38, anode 34, and cathode 36 are disposed between gas diffusion layers (GDLs) 40 and 42.

Electrolyte 38 should be capable of allowing ions to flow therethrough while providing a substantial resistance to the flow of electrons. In some embodiments, electrolyte 38 is a solid polymer (e.g., a solid polymer ion exchange membrane), such as a solid polymer proton exchange membrane (e.g., a solid polymer containing sulfonic acid groups). Such membranes are commercially available from E.I. DuPont de Nemours Company (Wilmington, Del.) under the trademark NAFION. Alternatively, electrolyte 38 can also be prepared from the commercial product GORE-SELECT, available from W.L. Gore & Associates (Elkton, Md.).

Anode 34 can be formed of a material, such as a catalyst, capable of interacting with methanol and water to form carbon dioxide, protons and electrons. Examples of such materials include, for example, platinum, platinum alloys (such as Pt—Ru, Pt—Mo, Pt—W, or Pt—Sn), platinum dispersed on carbon black. Anode 34 can further include an electrolyte, such as an ionomeric material (e.g., NAFION) that allows the anode to conduct protons. Alternatively, a suspension is applied to the surfaces of gas diffusion layers (described below) that face solid electrolyte 38, and the suspension is then dried. The method of preparing anode 34 may further include the use of pressure and temperature to achieve bonding.

Cathode 36 can be formed of a material, such as a catalyst, capable of interacting with oxygen, electrons and protons to form water. Examples of such materials include, for example, platinum, platinum alloys (such as Pt—Co, Pt—Cr, or Pt—Fe) and noble metals dispersed on carbon black. Cathode 36 can further include an electrolyte, such as an ionomeric material (e.g., NAFION) that allows the cathode to conduct protons. Cathode 36 can be prepared as described above with respect to anode 34.

Gas diffusion layers (GDLs) 40 and 42 can be formed of a material that is both gas and liquid permeable. Examples of GDLs are available from various companies such as Etek in Natick, Mass., SGL in Valencia, Calif., and Zoltek in St. Louis, Mo. GDLs 40 and 42 can be electrically conductive so that electrons can flow from anode 34 to an anode flow field plate (not shown) and from a cathode flow field plate (not shown) to cathode 36.

Other embodiments of direct methanol fuel cells and fuel cell systems, including methods of use, are described, for example, in commonly assigned U.S. Ser. No. 10/779,502, filed on Feb. 13, 2004, and entitled "Fuel Cell"; "Fuel Cell Systems Explained", J. Laraminie, A. Dicks, Wiley, New York, 2000; "Direct Methanol Fuel Cells: From a Twentieth Century Electrochemist's Dream to a Twenty-first Century Emerging Technology", C. Lamy, J. Leger, S. Srinivasan, Modern Aspects of Electrochemistry, No. 34, edited by J. Bockris et al., Kluwer Academic/Plenum Publishers, New York (2001) pp. 53-118; and "Development of a Miniature Fuel Cell for Portable Applications", S. R. Narayanan, T. I. Valdez and F. Clara, in Direct Methanol Fuel Cells, S. R. Narayanan, S. Gottesfeld and T. Zawodzinski, Editors, Electrochemical Society Proceedings, 2001-4 (2001) Pennington, N.J., all hereby incorporated by reference.

During operation of fuel cell system 20, fuel from fuel source 24 is introduced to anode 34, a cathode reactant (such as air) is introduced to cathode 36, and electrical energy is produced from the respective oxidation and reduction reactions as described above. Excess fuel and cathode reactant exit through outlets 28 and 31, respectively.

Other Embodiments

While certain embodiments have been described, other embodiments are possible.

Figure 10:
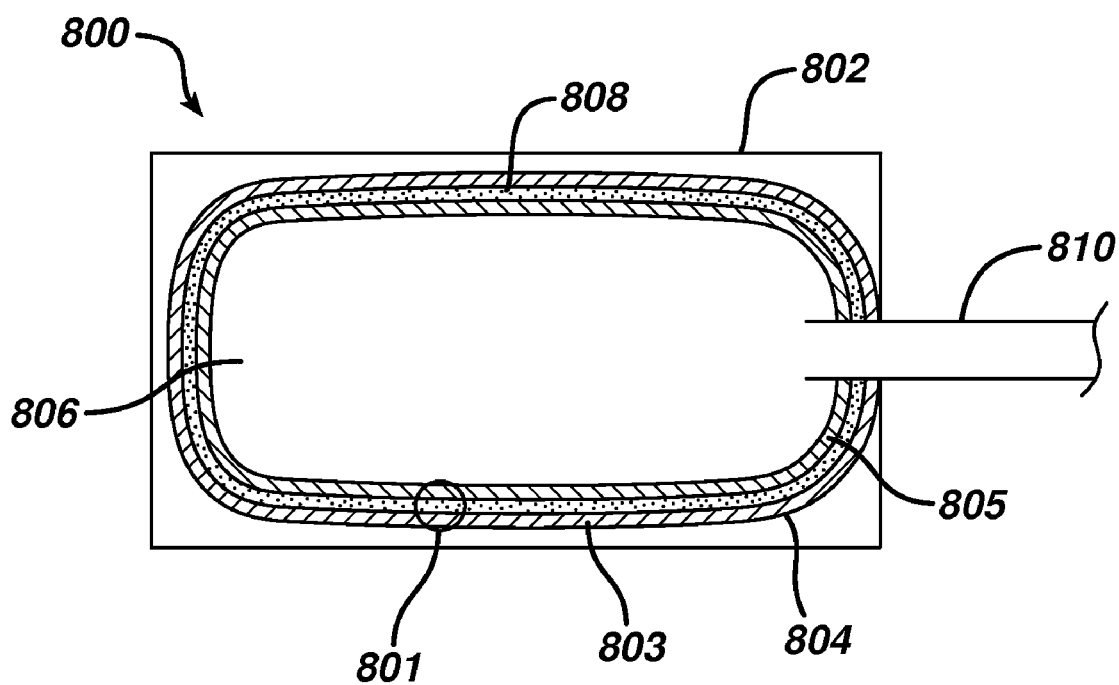
FIG. 10 is a side cross-sectional view of an embodiment of a fuel source.

As an example, in some embodiments, a colorant can be incorporated between layers of a multilayer housing that is part of a fuel source. For example, FIG. 10 shows a fuel source 800 including an outer housing 802 and an inner housing 804 within the outer housing. In certain embodiments, inner housing 804 may be relatively flexible (e.g., inner housing 804 may be in the form of a flexible bladder). Inner housing 804 contains a fuel 806. A fuel inlet 810 extends through both outer housing 802 and inner housing 804, and is in fluid communication with fuel 806. Inner housing 804 is formed of a multilayer structure 801 including two polymer layers 803 and 805, and a colorant 808. If fuel 806 leaks from inner housing 804 and/or fuel outlet 810 and contacts colorant 808, then the fuel can mix with colorant 808, so that the fuel becomes colored and the fuel leak thereby is visible. While a multilayer structure including two polymer layers and one colorant has been shown, in some embodiments, a multilayer structure can include more than two polymer layers (e.g., three layers, four layers, five layers) and/or can include more than one colorant (e.g., two colorants, three colorants, four colorants, five colorants). In certain embodiments, an outer housing such as outer housing 802 can be formed of a multilayer structure that includes a colorant.

As an example, while direct methanol fuel cell systems have been described, in some embodiments, a colorant can be used in a hydrogen fuel cell, such as a hydrogen polymer electrolyte membrane (PEM) fuel cell. Hydrogen fuel cells are described, for example, in U.S. Patent Application Publication No. US 2004/0229090, published on Nov. 18, 2004, and in U.S. Patent Application Publication No. US 2004/0229101, published on Nov. 18, 2004, both of which are hereby incorporated by reference.

As another example, in certain embodiments, a fuel source containing a fuel mixture that includes one or more colorants can provide a visual indication of leakage of the fuel mixture. Thus, the colorant(s) can serve as both fuel amount indicators and fuel leakage indicators.

As an additional example, in some embodiments, a fuel mixture and/or a coating on a fuel source can include one or more fluorescent colorants. Examples of commercially available fluorescent colorants include the following powder colorants, all available from Robert Koch Industries Inc.: Hi-pH Fluorescent Green 6220, Hi-pH Fluorescent Kelly Green 6225, and Hi-pH Fluorescent Gold 6525. Additional examples of commercially available fluorescent colorants include the following liquid colorants, both of which are available from Robert Koch Industries Inc.: Fluorescent Deep Orange 2270 15% Liquid, and Fluorescent Orange 2272 15% Liquid. In certain embodiments, a fuel mixture and/or a coating on a fuel source may include one or more fluorescent colorants that are visible under incandescent lighting or dark room lighting. A device (e.g., a portable electronic device such as a cell phone) that uses such a fuel mixture and/or fuel source may emit light (e.g., low-power incandescent light) to, for example, better show the presence of a fuel leak. In some embodiments, a coating and/or a fuel mixture can include multiple colorants, such as a fluorescent colorant and a non-fluorescent colorant.

As another example, while a pervaporation membrane has been described, in some embodiments, a fuel cell system, fuel source, and/or fuel cell can alternatively or additionally include one or more other types of membranes. Typically, the membrane(s) can be fuel-permeable. Examples of materials that can be used in fuel-permeable membranes (e.g., methanol-permeable membranes) include fluorocarbon polymers, polyethylene, polypropylene, polycarbonate, polyimides, polysulfones, polysulfides, polyurethanes, polyesters, and cellulose (e.g., paper). Fuel-permeable materials are further described, for example, in U.S. Ser. No. 10/957,935, filed on Oct. 4, 2004, and entitled "Fuel Sources, Fuel Cells and Methods of Operating Fuel Cells". In certain embodiments, the membrane(s) in a fuel cell system, fuel source, and/or fuel cell can be vapor-permeable and/or liquid-impermeable. In certain embodiments in which the membrane is liquid-impermeable, the membrane may be in the form of a continuous film and/or may not have any holes in it. The membrane(s) may be impermeable to one or more colorants.

As an additional example, in some embodiments, a fuel cell system, fuel cell, and/or fuel source can include a membrane that retains colorant from a fuel/colorant mixture as the mixture crosses the membrane, while allowing fuel from the mixture to pass through the membrane. In some such embodiments, an increase in the concentration of colorant in the membrane over time can be used to signal the amount of fuel remaining in a fuel source. Examples of materials that can be used in colorant-retaining membranes include charcoal filter materials and ion-exchange resins. In certain embodiments, a colorant-retaining membrane can be a reverse osmosis membrane.

As a further example, in certain embodiments, a fuel cell system, fuel source, and/or fuel cell may include a removable (e.g., detachable) membrane or filter. For example, a fuel source may include a removable pervaporation membrane.

As another example, in some embodiments, a mixture that contains a fuel and a colorant may change color as the concentration of the colorant in the mixture changes. Thus, as the fuel in the mixture is consumed and the concentration of the colorant in the mixture increases, the color of the mixture can change (e.g., from yellow to green, from blue to red), thereby providing a signal of the amount of fuel remaining in the mixture. In some embodiments, the mixture can include a combination of colorants, such as Acid Yellow 1, or Naphthol Yellow S, and Solvent Blue 37. Colorants are described, for example, in U.S. Patent Application Publication No. US 2003/0134162 A1, published on Jul. 17, 2003, which is hereby incorporated by reference.

As an additional example, while fuel sources including colorants have been described, in some embodiments, other components of a fuel cell system (e.g., a fuel cell stack) may include one or more colorants, such as the colorants described above.

Figure 11:
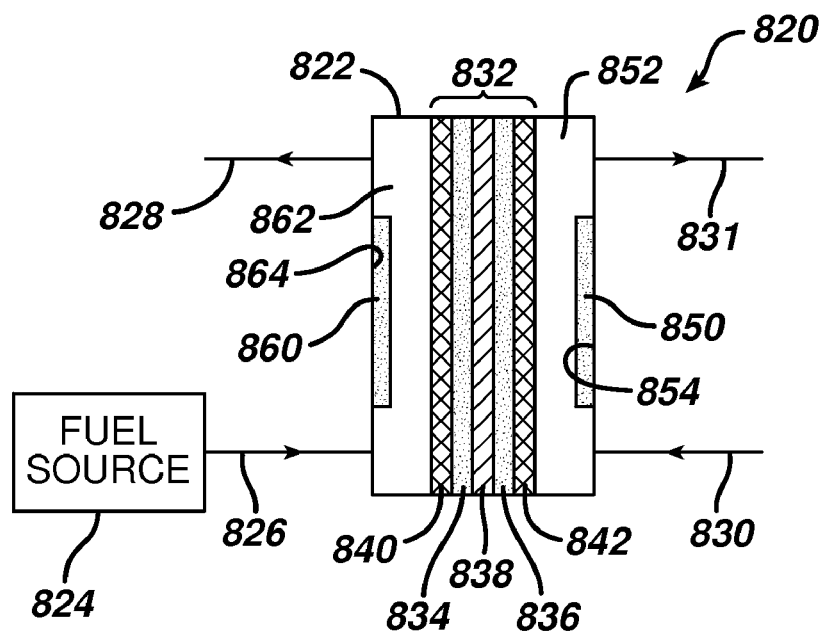
FIG. 11 is a schematic diagram of an embodiment of a fuel cell system.

For example, FIG. 11 a fuel cell system 820 that includes a fuel cell stack 822, a fuel source 824 in fluid communication with the fuel cell stack via a fuel inlet 826, a fuel outlet 828, a cathode reactant (e.g., air) inlet 830 in fluid communication with the fuel cell stack, and a cathode reactant outlet 831. As shown, fuel cell stack 822 includes a fuel cell 832 including an anode 834 in fluid communication with fuel source 824, a cathode 836, an electrolyte 838 between the anode and the cathode, and two gas diffusion layers (GDL) 840 and 842. Fuel cell stack 822 further includes an anode chamber 862 having an interior surface 864, and a cathode plenum 852 having an interior surface 854. As shown in FIG. 11, a portion of interior surface 864 is coated with a colorant layer 860, and a portion of interior surface 854 is coated with a colorant layer 850. If fuel contacts colorant layer 860 and/or colorant layer 850, then the colorant(s) in the colorant layers can mix with the fuel, providing a visual indication of a fuel leak.

Figure 12:
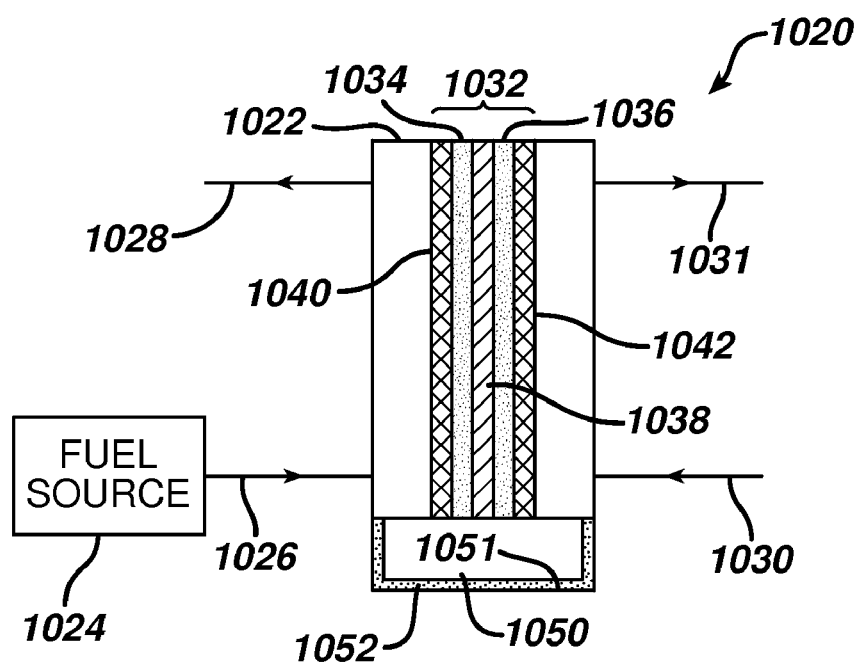
FIG. 12 is a schematic diagram of an embodiment of a fuel cell system.

In some embodiments, a fuel cell may include a colorant in one or more other locations. For example, FIG. 12 shows an embodiment of a fuel cell system 1020 that includes a fuel cell stack 1022, a fuel source 1024 in fluid communication with the fuel cell stack via a fuel inlet 1026, a fuel outlet 1028, a cathode reactant (e.g., air) inlet 1030 in fluid communication with the fuel cell stack, and a cathode reactant outlet 1031. As shown, fuel cell stack 1022 includes a fuel cell 1032 including an anode 1034 in fluid communication with fuel source 1024, a cathode 1036, an electrolyte 1038 between the anode and the cathode, and two gas diffusion layers (GDL) 1040 and 1042. Fuel cell stack 1022 further includes a chamber 1050 (e.g., formed of a transparent material) having an interior surface 1051. A portion of interior surface 1052 is coated with a colorant layer 1052. If fuel leaks into chamber 1050 and contacts colorant layer 1052, then the colorant(s) in the colorant layer can mix with the fuel, providing a visual indication of a fuel leak.

All references, such as patent applications, publications, and patents, referred to herein are incorporated by reference in their entirety.

Other embodiments are in the claims.

What is claimed is:

1. A cartridge, comprising:
    a first housing having an interior surface and an exterior surface;
    a second housing within the first housing, the second housing containing an alcohol fuel or a hydrocarbon fuel and having an interior surface and an exterior surface; and
    a first colorant, not in contact with the alcohol fuel or the hydrocarbon fuel, that is supported by at least a portion of the interior surface of the first housing;
    wherein if the alcohol fuel or the hydrocarbon fuel leaks from the second housing the alcohol fuel or the hydrocarbon fuel contacts the colorant and the alcohol fuel or the hydrocarbon fuel becomes colored and the leak thereby visible.

2. The cartridge of claim 1, wherein the first colorant contacts the interior surface of the first housing.

3. The cartridge of claim 1, wherein the first colorant further is supported by at least a portion of the exterior surface of the second housing.

4. The cartridge of claim 3, wherein the first colorant contacts the exterior surface of the second housing.

5. The cartridge of claim 1, further comprising a second colorant that is supported by at least a portion of the exterior surface of the second housing.

6. The cartridge of claim 5, wherein the second colorant contacts the exterior surface of the second housing.

7. The cartridge of claim 5, wherein the second colorant is different from the first colorant.

8. The cartridge of claim 1, wherein the second housing contains an alcohol fuel.

9. The cartridge of claim 8, wherein the alcohol fuel comprises methanol.

10. The cartridge of claim 1, wherein the first colorant comprises a powder colorant.

11. A cartridge, comprising:
    a first housing having an interior surface and an exterior surface;
    a second housing within the first housing, the second housing containing an alcohol fuel or a hydrocarbon fuel and having an interior surface and an exterior surface; and
    a colorant, not in contact with the alcohol fuel or the hydrocarbon fuel, that is supported by at least a portion of the exterior surface of the second housing;
    wherein if the alcohol fuel or the hydrocarbon fuel leaks from the second housing the alcohol fuel or the hydrocarbon fuel contacts the colorant and the alcohol fuel or the hydrocarbon fuel becomes colored and the leak thereby visible.

12. The cartridge of claim 11, wherein the colorant contacts the exterior surface of the second housing.

13. The cartridge of claim 11, wherein the second housing contains an alcohol fuel.

14. The cartridge of claim 13, wherein the alcohol fuel comprises methanol.

15. The cartridge of claim 11, wherein the colorant comprises a powder colorant.

16. A cartridge, comprising:
    a cartridge housing;
    a mixture comprising a first colorant and an alcohol fuel or a hydrocarbon fuel within the cartridge housing; and
    a fuel outlet including a membrane that is liquid-impermeable and vapor-permeable, wherein the alcohol fuel or the hydrocarbon fuel can pass through the membrane in vapor form but not in liquid form.

17. The cartridge of claim 16, wherein the membrane is impermeable to the first colorant.

18. The cartridge of claim 16, wherein the membrane comprises silicone.

19. The cartridge of claim 16, wherein the membrane comprises poly(dimethyl)silicone or poly(trimethyl) silyl propyne.

20. The cartridge of claim 16, wherein the membrane comprises a material selected from the group consisting of fluorocarbon polymers, polyethylene, polypropylene, polycarbonates, polyimides, polysulfones, polysulfides, polyurethanes, polyesters, cellulose, and combinations thereof.

21. The cartridge of claim 16, wherein the first colorant comprises a liquid colorant or a powder colorant.

22. The cartridge of claim 16, further comprising a second colorant that is different from the first colorant.

23. The cartridge of claim 16, wherein the mixture comprises at most about one percent by weight of the first colorant.

24. The cartridge of claim 16, wherein the mixture comprises an alcohol fuel.

25. The cartridge of claim 24, wherein the alcohol fuel comprises methanol.

26. A cartridge, comprising:
    a first housing;
    a second housing, within the first housing, containing an alcohol fuel or a hydrocarbon fuel; and
    a first colorant, not in contact with the alcohol fuel or the hydrocarbon fuel;
    wherein if the alcohol fuel or the hydrocarbon fuel leaks from the second housing the alcohol fuel or the hydrocarbon fuel contacts the colorant and the alcohol fuel or the hydrocarbon fuel becomes colored and the leak thereby visible.

27. The cartridge of claim 26, wherein the second housing includes two layers and the first colorant is between the two layers.

28. The cartridge of claim 26, wherein (a) there is a space between the first housing and the second housing, (b) the cartridge further includes a fuel outlet extending through the space and extending to the second housing, the fuel outlet having an exterior surface exposed to the space; and (c) the first colorant is supported by at least a portion of the exterior surface of the fuel outlet.

* * * * *

UNITED STATES PATENT AND TRADEMARK OFFICE
CERTIFICATE OF CORRECTION

PATENT NO. : 7,767,351 B2
APPLICATION NO. : 12/617930
DATED : August 3, 2010
INVENTOR(S) : Anna Maria Bofinger et al.

It is certified that error appears in the above-identified patent and that said Letters Patent is hereby corrected as shown below:

In Column 16, Line 25, Claim 19, delete "poly(trimethyl) silyl" and insert --poly(trimethyl)silyl --, therefor.

Signed and Sealed this
Eighth Day of February, 2011

David J. Kappos
*Director of the United States Patent and Trademark Office*